Patented Feb. 25, 1936

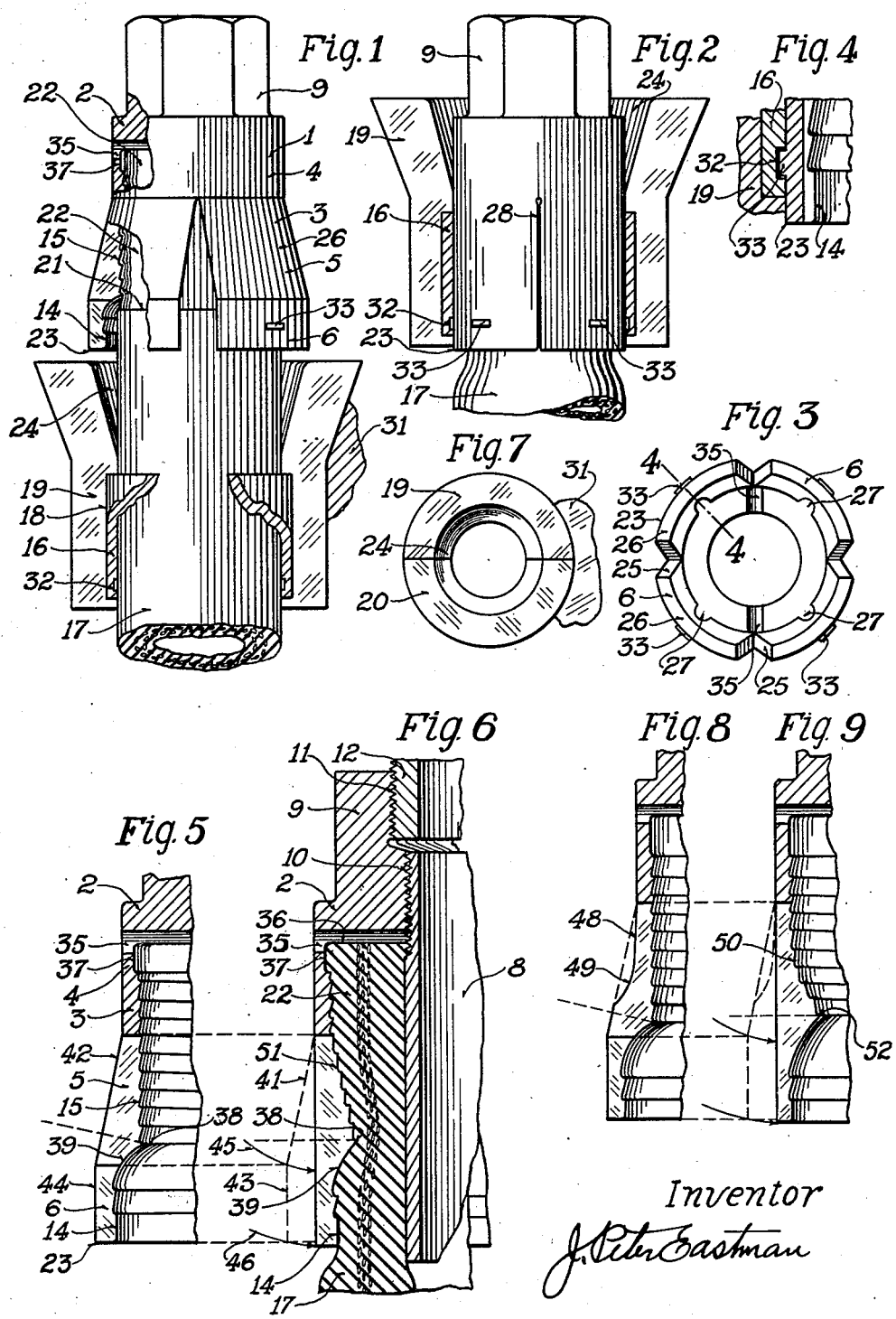

2,031,824

UNITED STATES PATENT OFFICE 2,031,824

METHOD OF PRESSING A COUPLING ON TO A HOSE

Joseph Peter Eastman, Manitowoc, Wis.

Original application April 20, 1934, Serial No. 721,517. Divided and this application August 28, 1935, Serial No. 38,149

5 Claims. (Cl. 29—88.2)

This application is divided from my co-pending application Serial No. 721,517, filed April 20, 1934, upon Pressed-on hose couplings. That application is for an improvement upon my still earlier application Serial No. 484,046, filed September 24, 1930, which was then a co-pending case, and which has since issued as Patent No. 1,969,548.

The present invention relates to methods of pressing a coupling on to a hose. It is for use with that class of hose couplings known as pressed-on couplings, which, in order to make them grip the hose, are permanently contracted on to it, as distinguished from that class in which parts are screwed together to effect the gripping.

In particular the invention provides a method which accomplishes, all in one operation, the three following objects, namely:—

(1) It contracts the coupling to grip the hose.

(2) It places a band in position encircling the coupling, to be left there permanently, said band supplying all strength needed to resist bursting pressure, whereby it is possible to use a coupling that is split longitudinally.

(3) An inwardly protruding ring on the inside of the sleeve of the hose is desirable for the purpose of gripping the hose the more effectively. But, if such ring existed, as an internal matter, before contraction, it would prevent insertion of the hose into the sleeve, and would, moreover, make the sleeve less easy to bore. Under the present invention, however, such ring can be provided, originally, not as an internal but as an external, thickening of the wall of the sleeve. The present method then converts it into an inward protrusion.

In the drawing:—

Fig. 1 is a plan, partly in section, showing a coupling ready to be contracted on to a hose according to the method which is the subject of the present invention, the front half of the die being removed.

Fig. 2 is a plan showing the condition after contraction, the front half of the die being removed.

Fig. 3 is an end elevation of the mouth of the coupling before contraction, and before insertion of the hose.

Fig. 4 is a fragmentary cross section on line 4—4, Fig. 3, showing the interlocking of the band and sleeve.

Figs. 5 and 6 are sectional, broken away, plan views, respectively before and after contraction, the hose being removed in Fig. 5.

Fig. 7 is a plan view showing the split die.

And Figs. 8 and 9 show a modification, they being sectional, broken away, plan views, respectively before and after contraction, the hose being removed in both cases.

Referring to the drawing, and describing first the preferred form, Figs. 1 to 6:—

Referring more particularly to Figs. 1, 3, and 5, which show the coupling before contraction:—

The coupling 1 has the end wall 2 with the sleeve 3 projecting therefrom.

Said sleeve 3 consists of the smaller bored cylindrical portion 4 nearest to said end wall, the intermediate portion 5, and the larger bored cylindrical portion 6 furthest from said end wall.

Said intermediate portion 5 is internally cylindrical and externally conical before contraction, Figs. 1, 3, and 5, whereby it constitutes, in effect, an annular wedge, having its apex toward said end wall 2.

The internal reinforcing tube 8, usually called the "insert", visible in Fig. 6 only, is present in all cases.

The hexagonal neck 9 extending from said end wall 2 gives a grip for a wrench, and is internally threaded at 10, Fig. 6, to receive said "insert" 8. Also it has the female thread 11, Fig. 6, to receive the male threaded end 12 of another coupling or of other equipment.

Internal rings 14 in said further cylindrical portion provide hose gripping means, while the coarse internal thread 15 in said intermediate portion 5 and in said nearer cylindrical portion 4 provide gripping means, while also they facilitate the insertion of the hose end.

Referring more particularly to Fig. 1. The band 16 is a length of strong metal tube. The end of the hose 17 is passed through it, and its lower half lies in the recess 18; in the lower half-die 19. The upper half-die 20, Fig. 7, not shown in Figs. 1 and 2, is similarly recessed, and receives the upper half of said band.

Said hose 17 is somewhat reduced in diameter at the shoulder 21, and the hose end 22, thus reduced, is screwed with some difficulty into said threads 15, this connection being made as tight a fit as is practicable.

Thereafter the process of contraction is as follows:—

The rim 23, of the bell-mouthed extreme end of said sleeve 3, is entered into the tapered orifice 24 of the dies; and the coupling is forced into the die until the position shown in Fig. 2 is reached, during which process said sleeve is contracted inward until its bell-like external shape before contraction, as shown in Fig. 1, has disappeared, and it has become cylindrical externally.

The four notches or tapered slits 25, extending lengthwise of the sleeve through said furthest portion 6, and through said intermediate portion 5, divide said portions into four segments or tongues 26, extending longwise of the sleeve.

In the construction shown in my Patent No. 1,969,548 aforesaid, it is necessary to reduce the girth of a solid continuous ring of metal, which requires great pressure. The present notches 25 obviate the need for that pressure, thereby greatly facilitating said process of contraction. Also the longwise grooves 27 are provided, extending along the middle of the inside faces of said tongues 26, which make it easier to bend said tongues to the sharper curves which they must assume during said contraction.

During said process of contraction, accordingly, said tongues 26 gradually approach each other until they meet along their edges in the straight line 28, Fig. 2, closing up said notches 25. And, during said process, the whole of the metal of said tongues 26 adjusts itself to the new shapes required of the tongues. But this the metal does without the great pressure that would have been needed if the notches had not been made.

When the contracting has been finished as described, leaving the parts in the relative positions shown in Fig. 2, the dies can be released from the annular die-block 31, Fig. 7. Said half-dies 19 and 20 can then be removed, and they will leave behind them said band 16 in position upon the sleeve, binding said tongues 26 tightly against the hose.

The groove 32 is provided on the inside face of said band, and the lugs 33 are provided on the outside of said sleeve. During the contraction, as soon as said lugs register with said groove, they spring into the same, due to the outward pressure of the hose substance, and they thereby lock said band against any possible displacement in the axial direction.

Vents 35 are provided communicating between the end 36 of the hose, Fig. 6, and the outer air.

In addition to said vents 35, the annular recess 37 is provided, chambered out in the inside wall of the sleeve, and in communication with said vents for the following purpose:—

It is found in practice that space, close at hand, for a portion of the hose substance displaced during contraction to escape into, is imperative, for which purpose the vents are not adequate. The present annular chamber is therefore provided. When the reduced hose end 22 is screwed into the threads 15 as hereinbefore described, it butts against said end wall 2, but leaves said recess 37 unfilled for the time being, see Figs. 1 and 5. But, after contraction, said recess 37 is filled, as is shown in Fig. 6; or it may be only partly filled.

Said recess 37 therefore relieves what is, in effect, equivalent to a fluid pressure, exerted by the substance of that portion of the hose which is imprisoned at the inward end of the coupling, by the process of contraction. Said vents 35 are then left to carry out chiefly the following duties, namely, first, to allow air to escape while the hose end is being screwed in, before contraction; and, later, to allow any water or other fluid, which may leak back through said threads 10 of said reinforcing tube or "insert" 8, to escape to the outer air, thereby preventing said leakage from building up a back pressure at the end of the hose.

Referring more particularly to Figs. 5 and 6. The edge 38 marks the further end of the inside wall of said intermediate portion 5 of the sleeve, the word "further" here meaning further from said end wall 2. Before contraction, as shown in Fig. 5, said edge 38 is the beginning of the cylindrical threading 15 aforesaid which receives the end of the hose as hereinbefore described. But, after contraction, as shown in Fig. 6, said edge 38 has become the apex of an inwardly protruding annular ring biting into the substance of the hose to grip the hose.

Said inwardly protruding ring is one of the main features of the present construction, as was a corresponding ring in my Patent No. 1,969,548 aforesaid. The curve 39, however, which terminates said intermediate wedge-shaped portion 5 at its outward or thicker end, is a curve dictated by shop considerations, to reduce liability to fracture, and does not correspond with the cone which was provided in the corresponding location in my Patent No. 1,969,548.

As compared with said earlier construction, the present one makes it possible to locate said edge 38 further from said end wall 2, whereby after contraction, said edge 38 protrudes more deeply inward, and is consequently more effective as a grip.

As showing more clearly the changes in shape which are caused by the contraction, the dotted line 41, Fig. 6, corresponds with the line 42, Fig. 6, and shows the shape before contraction; while, similarly, the dotted line 43, Fig. 6, corresponds with the line 44, Fig. 5. The curved arrows 45 and 46 then show the path of the contraction.

Figs. 8 and 9 show a modification. They are views before and after contraction respectively. In this modification, the curved line 48, Fig. 8, takes the place of the straight line 42 of Fig. 5. Opposite the belly 49 of said curve 48 the contraction is therefore less than in the corresponding location in Fig. 5, whereby, after contraction, turning to Fig. 9, the inside line 50 is a curve, in contrast with the inside line 51 in Fig. 6, which is substantially straight. This construction gives added sharpness to the inwardly protruding ring 52, Fig. 9. The object in showing this modification is to show that the inward ring can be made more pronounced by suitably hollowing the outside of the annular wedge of the preferred form.

I claim:

1. The method of clamping a hose coupling on to the end of a hose which consists in positioning the segments of a split die around a band, the band then lying in a recess provided in the die, forcing the coupling endwise into the die and into the band, thereby contracting the coupling to grip the hose, and then removing the segments of the die, leaving the band encircling the coupling.

2. The method of clamping a hose coupling having a sleeve divided into tongues at its open end on to the end of a hose, which method consists in positioning the segments of a split die around a band, the band then lying in a recess provided in the die, forcing the sleeve endwise into the die and into the band, thereby causing the tongues of the sleeve to grip the hose, and then removing the segments of the die, leaving the band encircling said tongues of the sleeve.

3. The method of clamping a hose coupling, comprising a sleeve extending downwardly from an end wall, on to the end of a hose, which method consists in pushing a band down over the end of a hose to a substantial distance from the end, placing the coupling over the end of the hose, positioning the segments of a split die around the band, the band then lying in a recess provided in the die, forcing the sleeve endwise, beginning at its downward end, into the die and into the band, thereby contracting the sleeve to grip the hose, and then removing the segments of the die, leaving the band encircling the sleeve.

4. The method described in claim 1 with the further step that the forcing action of the die is continued until an interlocking is effected between the coupling and the band by the interengagement of a projection upon one such part with a recess in the other.

5. The method of clamping on to the end of a hose a hose-coupling which has a series of segmental gripping elements placed around the hose, which method consists in positioning the segments of a split die around a band, the band then lying in a recess provided in the die, forcing the coupling endwise into the die and into the band, the die having a tapered orifice whereby it gathers the segmental elements inward, causing them to grip the hose, and then removing the segments of the die, leaving the band encircling the said elements.

J. PETER EASTMAN.